United States Patent [19]
Waters et al.

[11] Patent Number: 5,913,035
[45] Date of Patent: Jun. 15, 1999

[54] COMPUTER NETWORK AVAILABILITY SYSTEM

[75] Inventors: Chris R. Waters, Royal Oak; Michael B. Hardy, Madison Heights; John D. Baker, Troy, all of Mich.

[73] Assignee: Chrysler Corporation, Auburn Hills, Mich.

[21] Appl. No.: 08/536,596

[22] Filed: Sep. 29, 1995

[51] Int. Cl.$^6$ .................................................. G06F 15/16
[52] U.S. Cl. ......................................................... 395/200.54
[58] Field of Search ........................... 395/200.11, 200.54

[56] References Cited

U.S. PATENT DOCUMENTS 5,513,321  4/1996  Katori ................................. 395/200.64

OTHER PUBLICATIONS

G. M. Chaudhry; "Performance and Dependability of Gracefully–Degradable Multiprocessor Systems"; Circuits and Systems, 1991 IEEE Midwest Symposium; pp. 962–965, 1992.

Alan Wood; NonStop Availability in a Client/Server Environment; Mar. 1994; Technical Report 94.1; Tandem Computers; Part No. 106404.

Wood et al.; An Analysis of Client/Server Outage Data; Apr. 26, 1995; International Computer Performance and Dependability Symposium; pp. 295–304.

Burns et al.; FASTAR Operations in the Real AT&T Transport Network; Dec. 2, 1993; GOLOBECOM '93: IEEE Global Telecommunications Conference; pp. 229–233.

*Primary Examiner*—Parshotam S. Lall
*Assistant Examiner*—Kenneth R. Coulter

[57] ABSTRACT

A computer-implemented method and apparatus for determining the availability of a computer network includes a computer program which receives outage signals that are representative of outages of network devices and network device interfaces, in the event that a particular device has more than one network interface. Also, the program receives online signals on a periodic basis and based on the online signals, determines the average number of online interface-minutes during a subset of a preselected period. Then, the number of outage minutes is divided by the average number of online interface-minutes and substracted from one, to generate an availability signal which can be output as an indication of network availability during the preselected period.

8 Claims, 2 Drawing Sheets

COMPUTER NETWORK AVAILABILITY SYSTEM

FIELD OF INVENTION

The present invention relates generally to computer networks, and more particularly to computer network management tools.

BACKGROUND OF THE INVENTION

Computer networks have become ubiquitous industrial and educational resources. A computer network can be a rudimentary simple local area network (LAN) over which as few as two computers communicate. On the other hand, a computer network, e.g., the Internet, can be a large and indeed global wide area network (WAN) over which millions of computers can communicate with each other and with other LANs and WANs that are connected to the network.

Typically, a computer network includes the electrical or fiber optic lines or wireless channels over which communication occurs, along with the various individual computers, LANS, and WANS, collectively referred to as "network devices", that are connected to (i.e., that are "interfaced with") the network. It happens that the number of network interfaces typically exceeds the number of network devices, because a single network device might be connected to the computer network via more than one interface.

It may readily be appreciated that the management of a computer network, particularly a WAN such as the Internet, can be a complex and challenging task. Consequently, management tools are required to support the decisions of network managers.

As recognized by the present invention, a reliable, valid measure of network availability can be a valuable tool in managing computer networks. In particular, the present invention recognizes that a valuable network management tool can be provided by determining the availability of the network as it relates to network device interface availability. In other words, a network availability measure should ideally account for the fact that a device might have more than one interface. Consequently, the present invention recognizes that a network availability measure should ideally be based on device interface availability as opposed to device availability.

Still further, the present invention recognizes that it is desirable to provide a network availability measure over one or more user-selected periods, e.g., weekly and monthly, and that measures be provided of the availability of the entire network as well as preselected portions of the network.

Accordingly, it is an object of the present invention to provide a method and apparatus for determining the availability of a computer network. Another object of the present invention is to provide a method and apparatus for determining the availability of a computer network based on the availability of the device interfaces of the network over a preselected period. Still another object of the present invention is to provide a method and apparatus for determining the availability of a computer network that is easy to use and cost-effective.

SUMMARY OF THE INVENTION

The invention concerns a procedure to determine the availability of a computer network. This invention is realized in a critical machine component that causes a digital processing apparatus to perform method steps for determining the availability of a computer network. Hereinafter, the machine component is referred to as a "computer program product" which includes a program storage device that is readable by the digital processing apparatus and which tangibly embodies a computer program. The computer program product combines a computer readable medium with program code elements that cause the digital processing apparatus to determine the availability of a computer network.

Accordingly, in one aspect of the present invention a computer tangibly embodies a program of instructions, and the program includes computer readable code means that are executable by the computer for determining the availability of a network. As intended by the present invention, the network includes a plurality of devices, and each device can have one or more interfaces.

In accordance with the present invention, the computer readable code means include means for receiving outage signals which are representative of outages of one or more of the interfaces. Additionally, computer readable code means are provided for receiving online signals representative of interfaces that are online during a preselected period. Further, computer readable code means generate an availability signal that represents the availability of the network during the preselected period. As disclosed in detail below, this availability signal is based upon the online signals and the outage signals. Then, computer readable code means cause an output device to indicate the availability of the network based upon the availability signal.

In a preferred embodiment, the computer determines an average online quotient based on the online signals and the length of the preselected period. More specifically, the computer receives online reports during a reporting period subset (e.g., daily) of the preselected period, and the average online quotient represents the average number of interfaces issuing online reports times the number of minutes in the reporting period. Thus, the average online quotient represents an average number of online interface-minutes for some subset of the preselected period.

In the preferred embodiment, a device down signal which represents the product of the number of interfaces of a first device and the minutes the first device is unavailable is generated when the outage signal indicates the unavailability of all interfaces of the first device. On the either hand, an interface down signal which represents the number of minutes a first interface in a second device is unavailable is generated when the outage signal indicates the unavailability of the first interface and the availability of other interfaces of the second device.

Per principles disclosed in detail below, the sum of the device down signal and interface down signal is determined and an outage time signal is generated in response. The availability signal is determined by subtracting from unity the ratio of the outage time signal and the average online quotient.

In another aspect of the present invention, a computer program device is disclosed which includes a computer program storage device readable by a digital processing system for performing method steps for generating a signal representative of the availability of a computer network.

In still another aspect of the present invention, a computer-implemented method is disclosed for generating a signal representative of the availability of a computer network.

In yet another aspect of the present invention, a computer network system includes a computer network characterized by a plurality of network devices, with each device having one or more interfaces. In turn, each interface is characterized during a preselected period by at least one of outage period and online period. A computer includes computer readable code means for receiving signals representative of the online periods and outage periods and generating a signal representative of network availability during the preselected period based thereupon.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
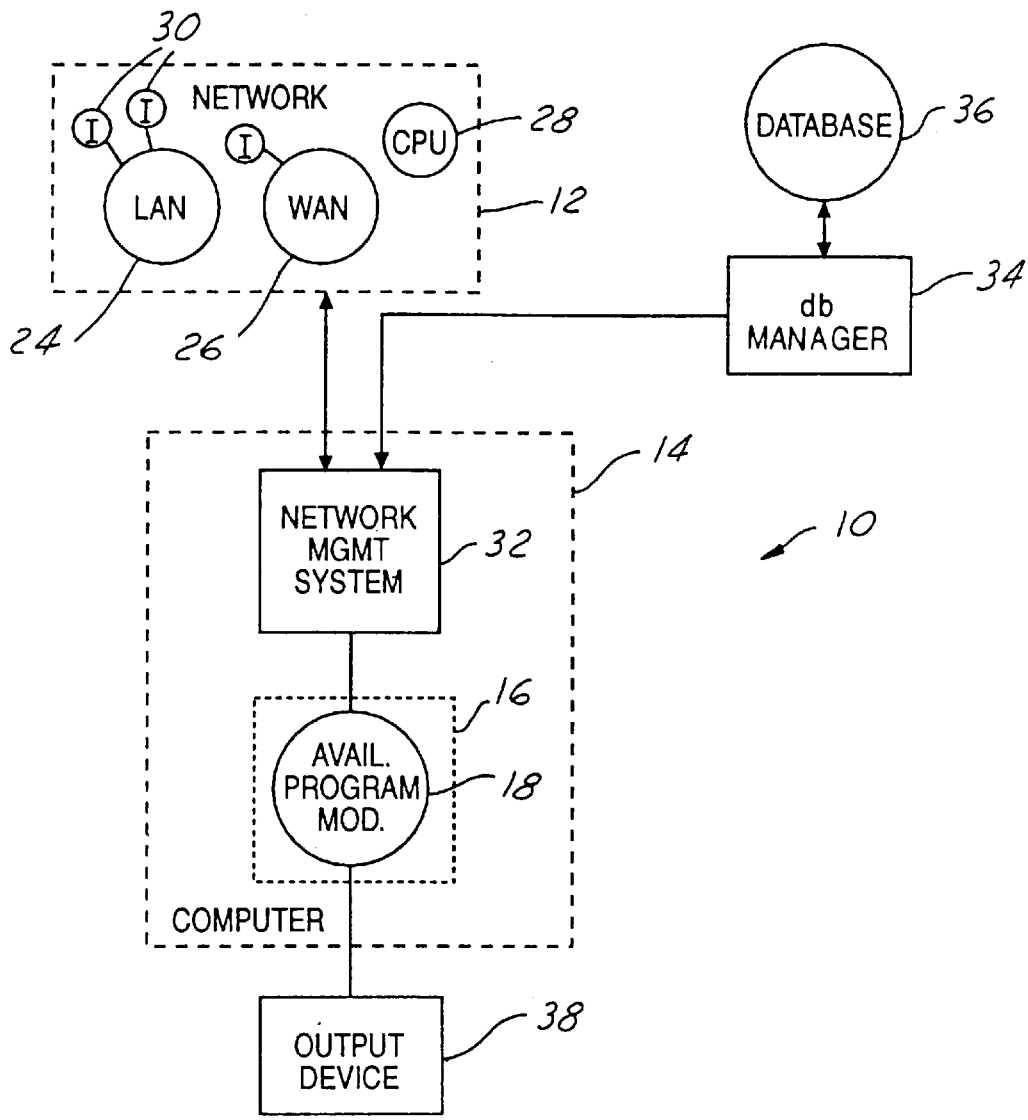
FIG. 1 is a schematic diagram of the computer network availability system of the present invention.

Referring initially to FIG. 1, a system for determining the availability of a computer network 12 is shown, generally designated 10. As shown, the system 10 includes a data processing computer 14 and an associated program storage device 16. In the presently preferred embodiment, the computer 14 is a type HP 9000/755 made by Hewlett-Packard and running the Unix-based operating system known as HP-UX 9.05.

In accordance with the present invention, the program storage device 16 may be implemented by a processor within the computer 14 that executes a series of computer-executable instructions embodied in a network availability module 18. These instructions may physically reside, for example, in RAM and/or ROM of the computer 14. Alternatively the instructions may physically be contained on a data storage medium such as a computer diskette 20 shown in FIG. 2. Or, the instructions may be stored on a DASD array, conventional hard disk drive, optical storage device, or other appropriate data storage device. In an illustrative embodiment of the invention, the computer-executable instructions may be lines of compiled C++ language code.

Figure 2:
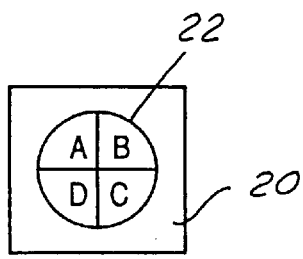
FIG. 2 is a schematic view of a program storage device of the present invention.
Figure 3:
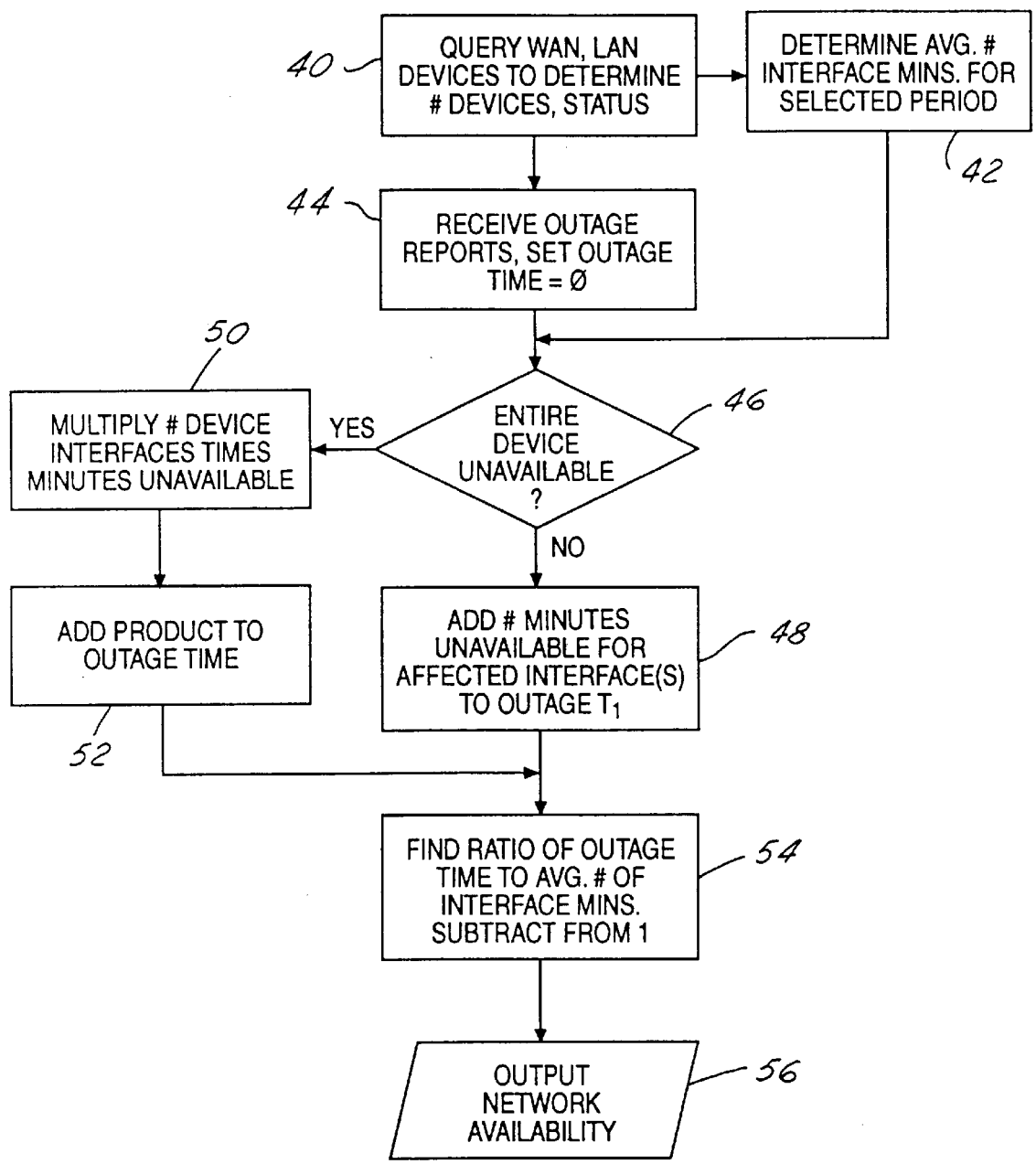
FIG. 3 is a flow chart showing the logic of the present invention in determining and reporting network availability

FIG. 3 illustrates the structure of such instructions as embodied in a computer program. Those skilled in the art will appreciate that FIG. 3 illustrates the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the Figures. The machine component is shown in FIG. 2 as a combination of program code elements A–D in computer readable form that are embodied in a computer-usable data medium 22, on the computer diskette 20. As mentioned above, however, such media can also be found in semiconductor devices, on magnetic tape, and on optical disks.

FIG. 1 shows that the network 12 can include one or more local area networks (LAWs) 24, one or more wide area networks (WANs) 26, and one or more individual computer CPUs 28. Collectively, the LAN 24, WAN 26, and CPU 28 are referred to as network devices, and each network device can have more than one network interface. For example, in the embodiment shown the LAN 24 has two network interfaces 30 through which the LAN 24 communicates with other devices of the network 12.

Additionally, the system 10 includes a network management system 32 that can be resident in the computer 14, or that can be resident in another computer (not shown) that is networked with the computer 14 by means well-known in the art. In accordance with principles well-known in the art, the network management system 32 controls and manages communication over the network 12. Further, as shown in FIG. 1, the network management system 32 can operatively communicate with the availability program module 18. In the presently preferred embodiment, the network management system 32 is the Unix-based management system marketed under the trade name "OpenView".

Furthermore the network management system 32 interfaces with a database manager 34 which in turn manages communications to and from a database 36. As intended by the present invention, the database 36 contains data regarding outage periods and online periods of the device interfaces of the network 12. In the presently preferred embodiment, the database 36 is resident on a mainframe computer made by International Business Machines of Armonk, New York, and the database manager 34 is made by Cybase and marketed under the trade name "OpenClient".

As disclosed more fully below, the availability program module 18 accesses data from the database 36 and online reports from the device interfaces 30 to determine network 12 availability. In response to its determination of network availability, the availability program module 18 causes an output device 38 to display or otherwise indicate network availability. Accordingly, the output device 38 can be a computer monitor or other electronic display device or a laser printer or other hard copy generating device.

Now referring to FIG. 3, the logic of the present invention in determining and reporting network availability can be seen. Commencing at block 40, for each reporting period subset (e.g., one day) of a preselected period (e.g., one month), the availability program module 18 queries the devices of the network 12, i.e. the LAN 24, WAN 26, and CPU 28, for a status report from each device. In response, each network 12 device, if it is online, reports the number of interfaces of the particular device and whether any or all interfaces are not online, and if not, why not. As discussed above, in the presently preferred embodiment, the step undertaken at block 40 is performed daily, although other reporting period subsets can be used.

Next, at block 42, at query time the availability program module 18 receives online signals from the devices of the network 12 that are representative of the total number of minutes the reporting devices and device interfaces were online during the reporting period subset. In accordance with the present inventions the availability program module 18 totals the number of device interface online minutes reported by the devices at query time. After determining the number of online interface-minutes, an average online quotient is generated at block 42.

Per the present invention, the average online quotient represents the average number of online device interface-minutes during a reporting period subset, e.g., one day, of a preselected period, e.g., one month. Accordingly, for the example shown wherein the query periodicity is one day and the preselected period is one month, at block 42 the availability program module 18 adds the number of interfaces online at query time multiplied by the number of minutes (i.e., 720) in the reporting period, to the number of interfaces that were online during the previous twenty nine (29) query periods multiplied by the number of minutes in the previous twenty nine (29) query periods. The computer then divides the sum by thirty (30).

It is to be understood, however, that the preselected period can be a calendar month, in which case the step undertaken at block 42 groups online reports by calendar month and then divides by the number of days in the particular month. In either case, the average online quotient is representative of the online reports, and more particularly the average online quotient is representative of the average number of online interface-minutes during the preselected period.

Moreover, the availability program module 18 also proceeds to block 44 from block 40, wherein the module 18 receives outage signals from the devices of the network 12 that are representative of outages of one or more of the device interfaces of the network 12 and, if desired, the reasons for the outages. Also, at block 44 the availability program module 18 sets a variable referred to herein as "outage time" to zero.

In addition to receiving outage signals directly from the devices of the network 12, the availability program module 18 can access the database 36 shown in FIG. 1 to retrieve device outage reports resident in the database 36, which reports accordingly establish outage signals. Thus, as intended herein an outage signal may be received by the availability program module 18 from sources, e.g., configuration files, inventory files, etc., other than and in addition to the devices of the network 12. These device outage signals can be generalized or detailed, e.g., the outage signals can indicate specific reasons for the outage, such as HUB hardware or software errors, router hardware or software errors, terminal server hardware or software errors, and circuit/wiring errors.

From blocks 42 and 44, for each outage report the availability program module 18 proceeds to decision block 46, wherein the module 18 determines, based upon the outage report, whether the entire device reporting the outage is unavailable, or whether only some of the reporting device's interfaces are unavailable. When an outage signal from a device indicates that only some, but not all, of the device's interfaces are unavailable, the availability program module 18 proceeds to block 48 to generate an interface down signal. In accordance with the preferred embodiment disclosed herein, the interface down signal represents the number of minutes an interface in the reporting device was unavailable. This number of minutes is added to "outage time" at block 48.

On the other hand, if, at decision block 46, an outage signal from a device indicates that the entire device was unavailable at query time, the availability program module 18 proceeds to block 50, wherein the module 18 determines the product of the number of interfaces of the reporting device and the total number of minutes the device was unavailable and generates a device down signal in response. Then, the availability program nodule 18 proceeds to block 52, where the product determined at block 50 (i.e., the device down signal) is added to "outage time". Accordingly, the outage time signal represents the sum of the device down signals and the interface down signals. It is to be understood that the availability program module 18 undertakes the steps shown at block 46–52, as appropriate, for each device outage report received.

From blocks 48 and 52, the availability program module 18 proceeds to block 54 to generate an availability signal that is representative of the availability of the network 12 during the preselected period. More particularly, at block 54 the availability program module 18 determines the ratio of outage time to average online quotient and subtracts this ratio from one, and then generates the availability signal in response thereto.

Next, at output state 56 the availability signal is output via the output device 38 (FIG. 1) to indicate the availability of the network 12 during the preselected period. In other words, at block 56 the availability program module 18 causes the output device 38 to indicate the availability of the network 12 based upon the availability signal generated at block 54. In accordance with the present invention, the output at block 56 can be a detailed report, broken down device-by-device and indeed interface-by-interface, as well as a report of overall network 12 availability. Also, the report can include reasons for any reported outage, e.g., terminal server hardware outage.

As intended by the present invention, planned outages of portions of the network 12 can be accounted for by excluding those portions from the availability computations. For example, decision block 46 can consult a list of planned outages for each outage report received to determine whether the outage has been planned. If the outage has been planned, the computations of blocks 48–52 will not be undertaken, and, hence, the variable "outage time" will not be incremented. Moreover, the steps shown in FIG. 3 can be performed for selected portions of the network 12, instead of the entire network 12, by considering outage signals and online signals only from the selected portions. With the above disclosure in mind, the skilled artisan will recognize that the present invention provides a flexible, valuable tool for managing computer networks.

While the particular COMPUTER NETWORK AVAILABILITY SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A computer network system, comprising:

a computer network including a plurality of network devices, each device having one or more interfaces, at least one device having plural interfaces, each interface being characterized during a preselected period by at least one of: outage periods and online period; and a computer including:

computer readable code means for receiving signals representative of the online periods and outage periods;

computer readable codes means for generating a device down signal representative of the product of the number of interfaces of a first device and the minutes the first device is unavailable when all interfaces of first device are unavailable;

computer readable code means for generating an interface down signal representative of the number of minutes a first interface in a second device is unavailable;

computer readable code means for generating an online signal representative of interfaces that are online;

computer readable code means for generating a signal representative of network availability during the preselected period based upon the device down signal, interface down signal, and the online signal; and computer readable code means for determining an average online quotient based on the online periods and the length of the preselected period.

2. The computer network system of claim 1, further comprising:

computer readable code means for determining the sum of the device down signal and interface down signal and generating an outage time signal in response thereto, wherein the availability signal is generated by subtracting from one the ratio of the outage time signal to the average online quotient.

3. A computer-implemented method for performing method steps for generating a signal representative of the availability of a network including a plurality of devices, each device having one or more interfaces, the method steps comprising:

receiving a plurality of outage signals, including at least a first outage signal and a second outage signal, representative of an outage of one or more of the interfaces of the first device;

generating a device down signal representative of the product of the number of interfaces of a first device and the minutes the first device is unavailable when the first outage signal indicates the unavailability of all interfaces of the first device;

generating an interface down signal representative of the number of minutes a first interface in a second device is unavailable, the second outage signal indicates the unavailability of the first interface and the availability of other interfaces of the second device;

receiving online signals representative of interfaces that are online during a preselected period;

generating an availability signal representative of the availability of the network during the preselected period based upon the online signals, the device down signal and the interface down signal;

causing an output device to indicate the availability of the network based upon the availability signal;

determining an average online quotient based on the online signals and the length of the preselected period;

generating a device down signal representative of the product of the number of interfaces of a first device and the minutes the first device is unavailable, when the outage signal indicates the unavailability of all interfaces of the first device;

generating an interface down signal representative of the number of minutes a first interface in a second device is unavailable, when the outage signal indicates the unavailability of the first interface and the availability of other interfaces of the second device; and determining the sum of the device down signal and interface down signal and generating an outage time signal in response thereto, wherein the availability signal is based upon the outage time signal and the average online quotient.

4. The computer-implemented method of claim 3, wherein the availability signal is determined by subtracting from unity the ratio of the outage time signal and the average online quotient.

5. A computer program device comprising:

a computer program storage device readable by a digital processing system; and a computer program on the program storage device and including instructions executable by the digital processing system for performing method steps for generating a signal representative of the availability of a network including a plurality of devices, each device having one or more interfaces, the method steps comprising:

receiving at least first and second outage signals representative of outages of one or more of the interfaces;

generating a device down signal representative of the product of the number of interfaces of a first device and the minutes the first device is unavailable, when the outage signal indicates the unavailability of all interfaces of the first device;

generating an interface down signal representative of the number of minutes a first interface in a second device is unavailable, when the outage signal indicates the unavailability of the first interface and the availability of other interfaces of the second device;

receiving online signals representative of interfaces that are online during a preselected period;

generating an availability signal representative of the availability of the network during the preselected period based upon the online signals and the interface down and device down signals; and causing an output device to indicate in human readable form the availability of the network based upon the availability signal.

6. The computer program device of claim 5, further comprising the step of:

determining an average online quotient based on the online signals and the length of the preselected period.

7. The computer program device of claim 6, further comprising the step of:

determining the sum of the device down signal and interface down signal and generating an outage time signal in response thereto, wherein the availability signal is based upon the outage time signal and the average online quotient.

8. The computer program device of claim 7, wherein the availability signal is determined by subtracting from unity the ratio of the outage time signal and the average online quotient.

* * * * *